Figure 1:
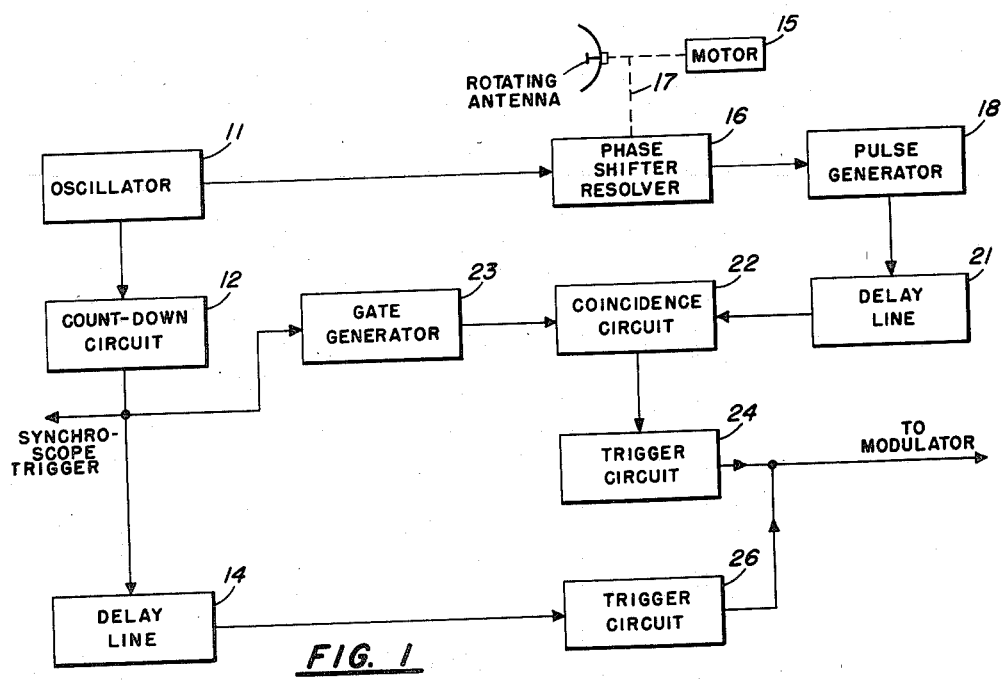

Dec. 9, 1958  G. V. RODGERS  2,864,080
AZIMUTH INDICATING SYSTEM
Filed March 30, 1956  7 Sheets-Sheet 1

INVENTOR
GEORGE V. RODGERS
BY
ATTORNEYS

Dec. 9, 1958        G. V. RODGERS        2,864,080

AZIMUTH INDICATING SYSTEM

Filed March 30, 1956        7 Sheets-Sheet 2

INVENTOR
GEORGE V. RODGERS
BY
ATTORNEYS

Dec. 9, 1958  G. V. RODGERS  2,864,080
AZIMUTH INDICATING SYSTEM
Filed March 30, 1956  7 Sheets-Sheet 3
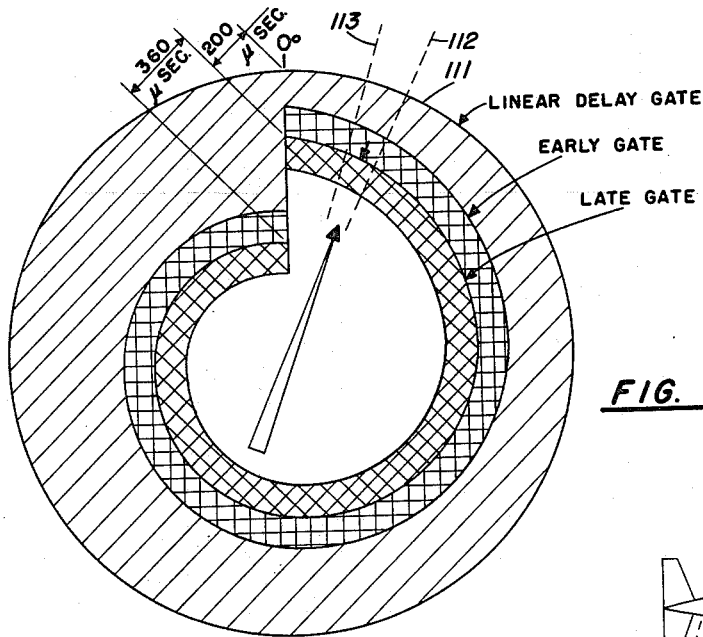
FIG. 6
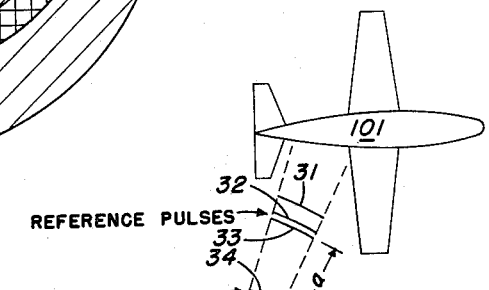
FIG. 5
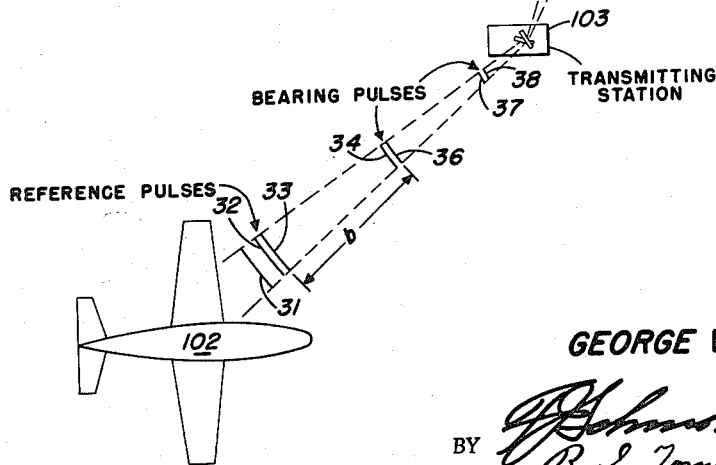
INVENTOR
GEORGE V. RODGERS
BY
ATTORNEYS

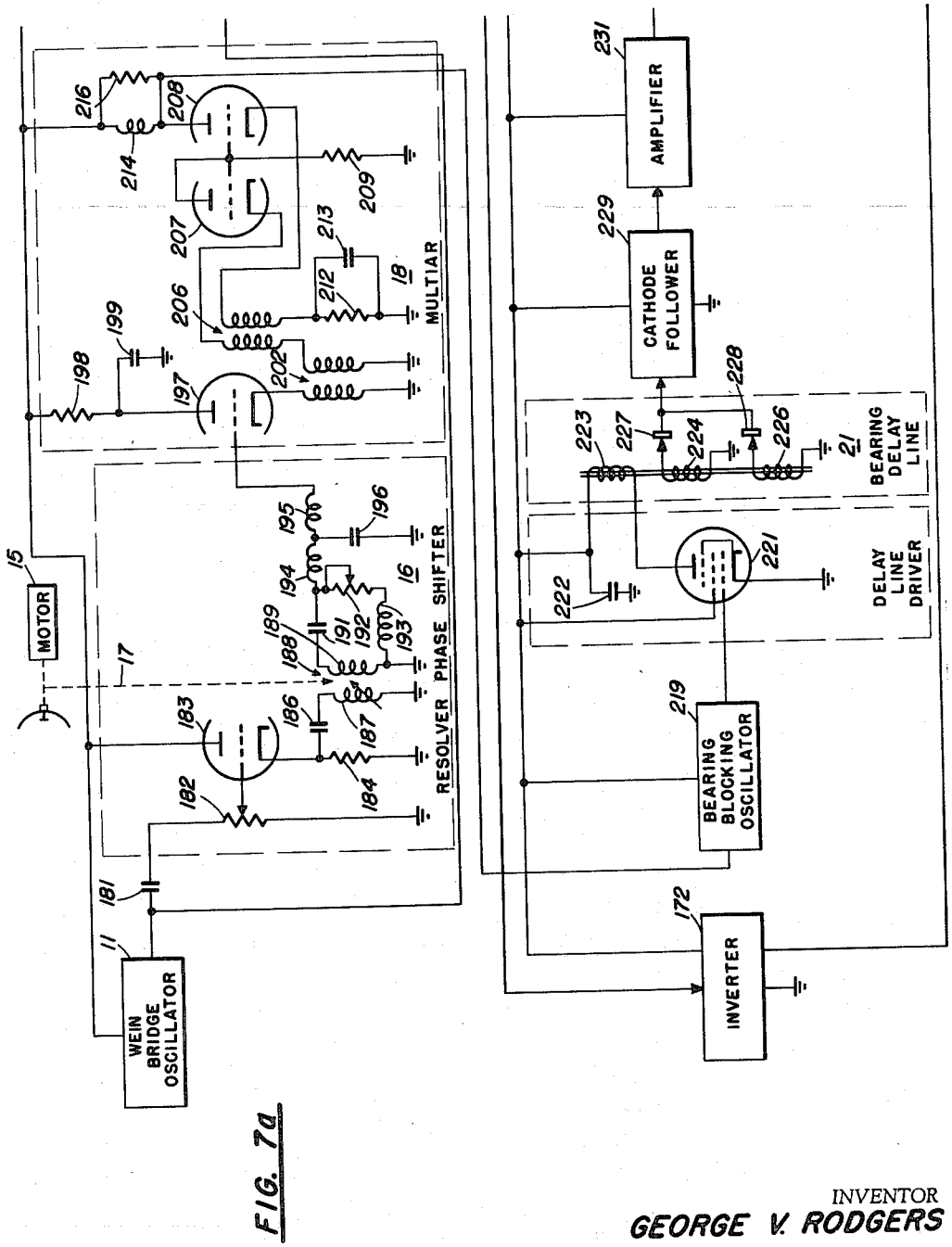

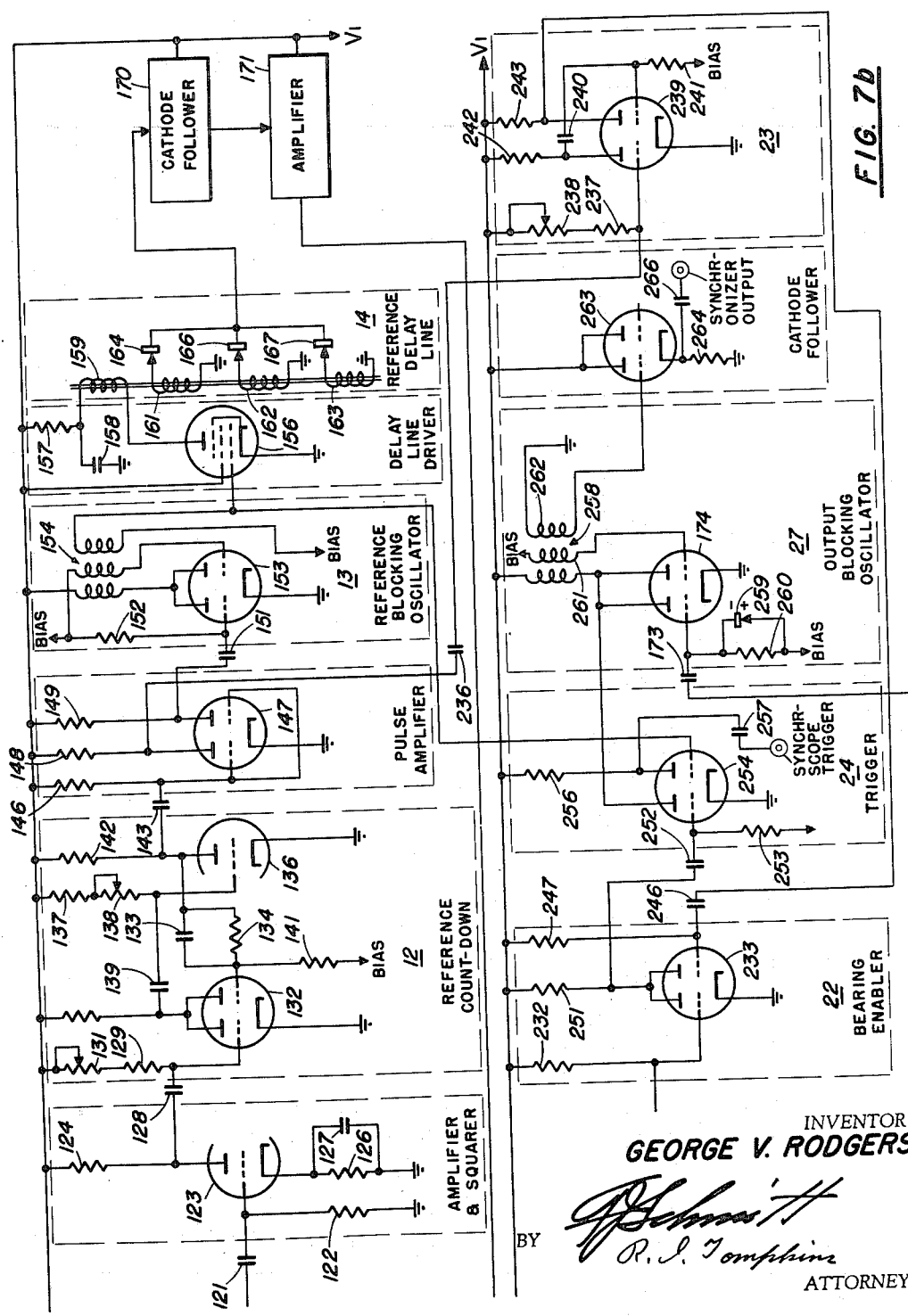

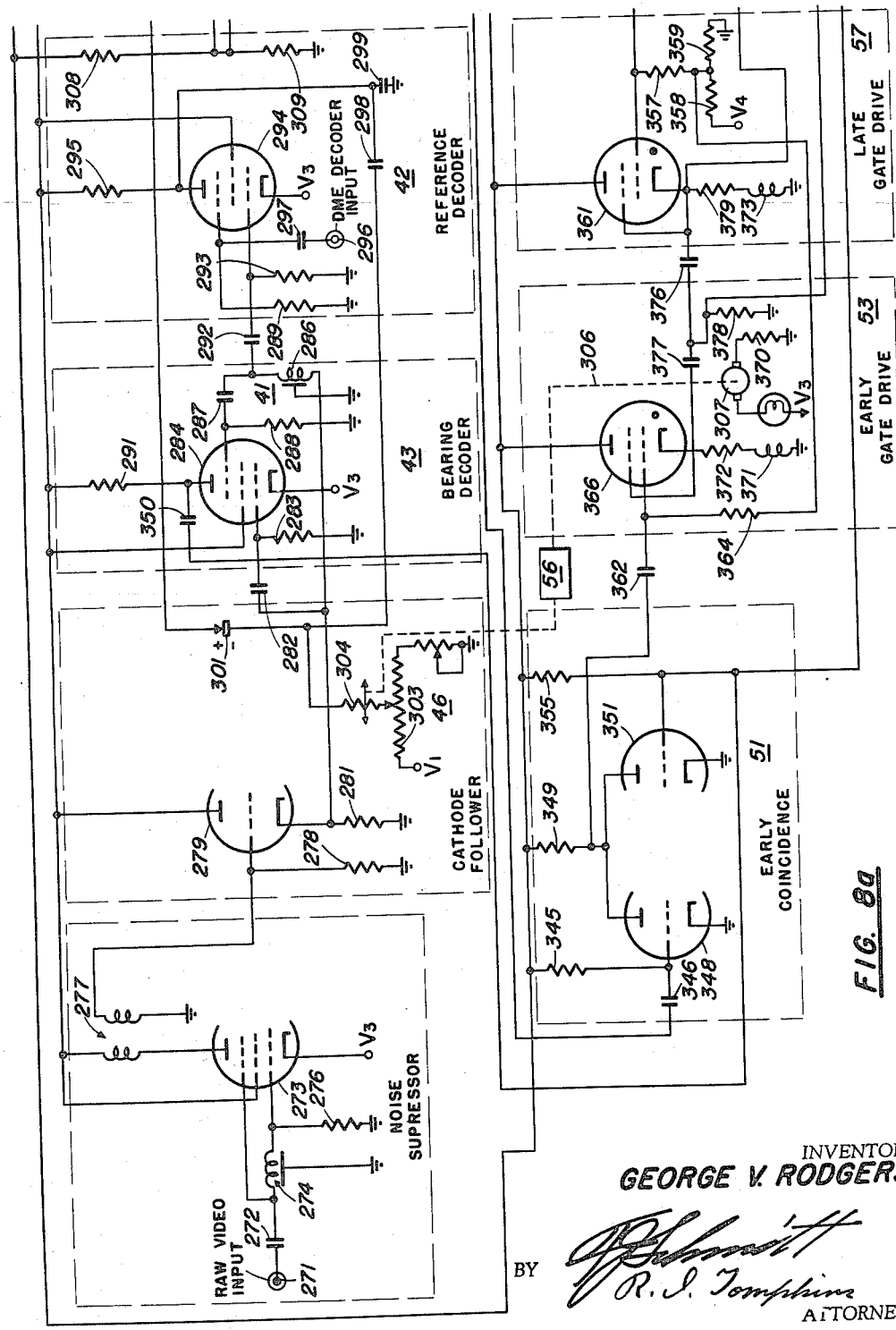

Dec. 9, 1958  G. V. RODGERS  2,864,080

AZIMUTH INDICATING SYSTEM

Filed March 30, 1956  7 Sheets-Sheet 7

INVENTOR
GEORGE V. RODGERS

BY

ATTORNEYS

United States Patent Office 2,864,080
Patented Dec. 9, 1958

2,864,080

AZIMUTH INDICATING SYSTEM

George Victor Rodgers, California, Md., assignor to the United States of America as represented by the Secretary of the Navy Application March 30, 1956, Serial No. 575,290

13 Claims. (Cl. 343—106)

(Granted under Title 35, U. S. Code (1952), sec. 266)

The invention described herein may be manufactured and used by or for the Government of the United States of America for governmental purposes without the payment of any royalties thereon or therefor.

The present invention relates to an azimuth indicating system and more particularly to an azimuth indicating system employing a transmitter and a receiver for providing at a radio receiving station a dial indication of the azimuth bearing with respect to a transmitting station.

The present invention existing pulse type equipment, such as distance measuring equipment (DME), consisting of a "synchronizer" at the transmitting station which generates pulse trains containing information which defines each azimuth bearing, and a "bearing indicator attachment" which is connected to an existing receiver and transforms the received bearing information into a dial indication of azimuth. Thus, azimuth and distance information are provided on the same radio frequency channel. Another feature of the present invention is the arrangement of the generated pulses to eliminate bearing errors or ambiguity in all of the azimuth sectors.

Accordingly an object of the present invention is to provide azimuth and distance information on the same radio frequency channel.

Another object is to provide a system which will give an indication of the position of one point with respect to a line through a reference point.

A further object of the invention is the provision of a system for giving an indication of azimuth without bearing errors or ambiguity in any azimuth sector.

Still another object is to provide a circuit for sequentially producing pulse groups wherein the pulses of each group are arranged as a function of the instantaneous azimuthal position of the transmitter antenna.

A still further object is to provide an azimuth indicating circuit for converting received pulse groups into a dial indication of the azimuthal position of a receiver.

Figure 2:
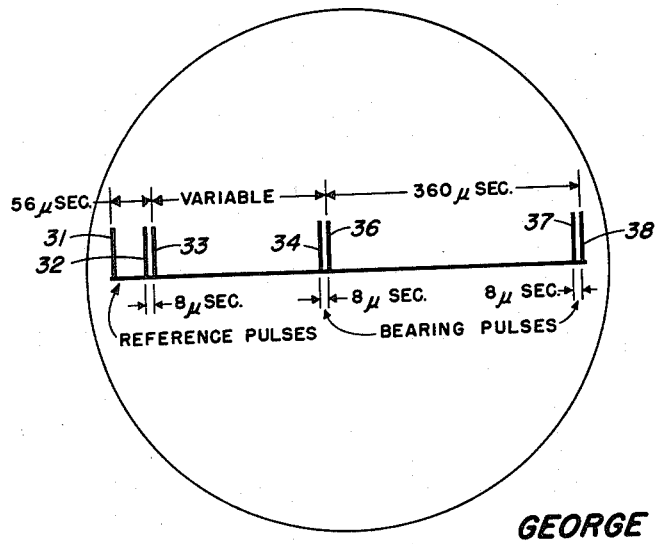
Figure 4:
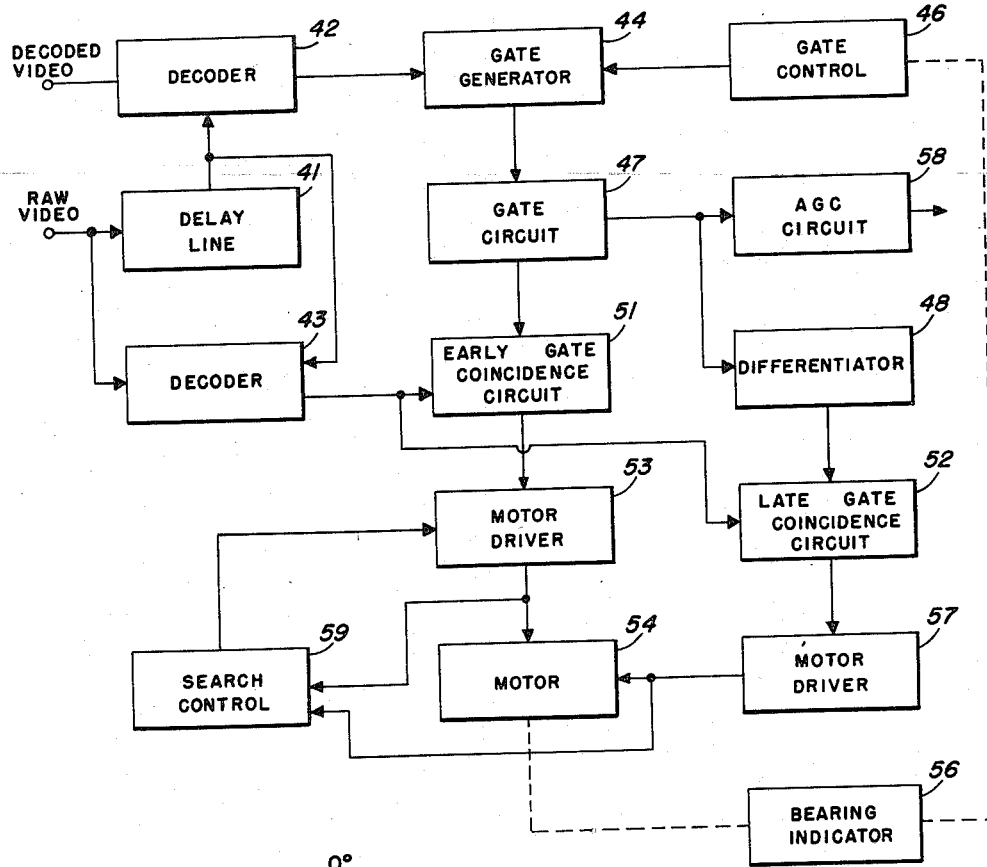
Figure 3:
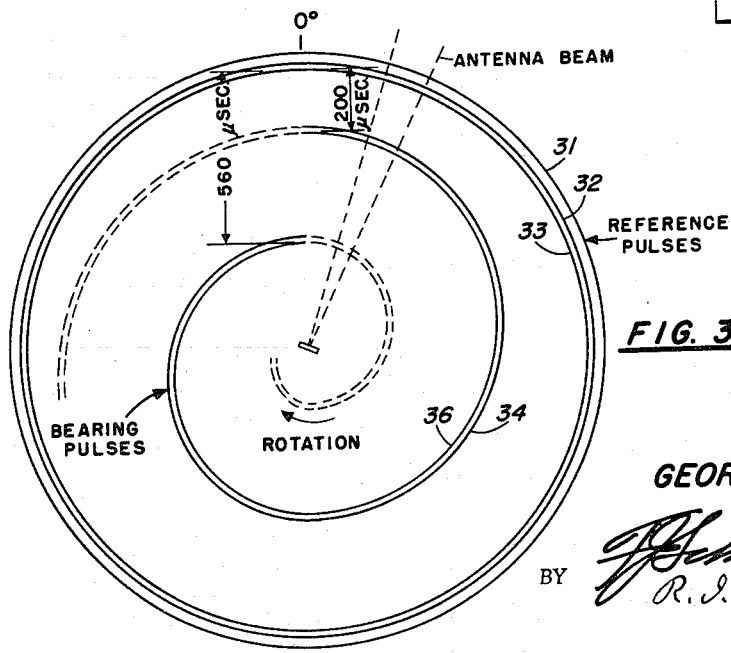
Figure 8B:
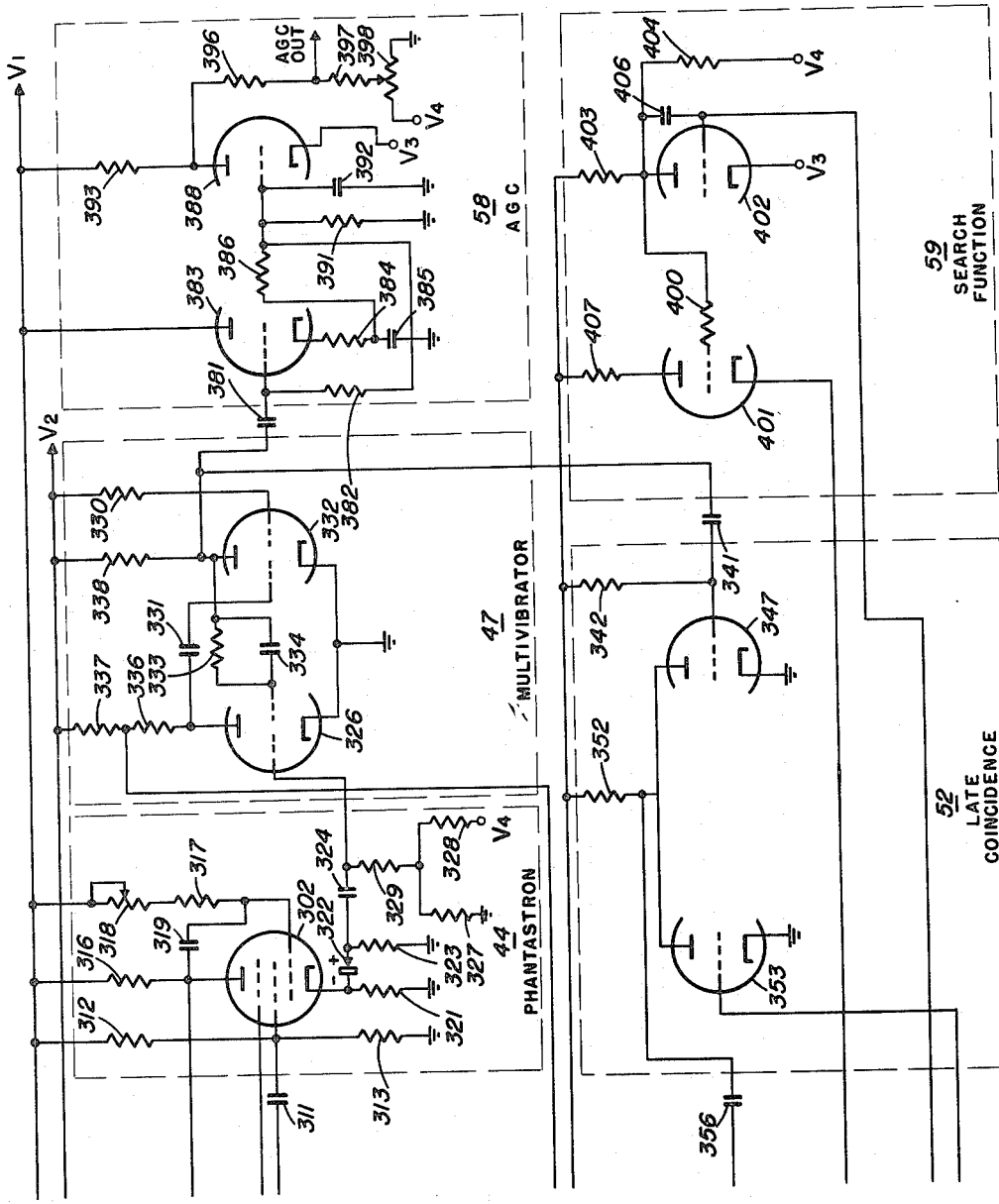

Other objects and many of the attendant advantages of this invention will be readily appreciated as the same becomes better understood by reference to the following detailed description when considered in connection with the accompanying drawings wherein:

Fig. 1 shows a block diagram of a preferred embodiment of bearing synchronizer,

Fig. 2 shows a typical pulse transmission of the synchronizer of Fig. 1 as it would appear on a properly synchronized oscilloscope, Fig. 3 illustrates a representation of the linear increase in bearing pulse spacing as the antenna attached to the synchronizer of Fig. 1 rotates, Fig. 4 is a block diagram of a preferred embodiment of a bearing indicator of the invention, Fig. 5 shows the different pulse arrangements received by two aircraft at different positions, Fig. 6 is a representation of the operation of some of the gate circuits of the embodiment of Fig. 4, Figs. 7a and 7b are circuit diagrams showing components suitable for the synchronizer embodiment of Fig. 1, and Figs. 8a and 8b are circuit diagrams showing components suitable for the bearing indicator embodiment of Fig. 4.

Referring now to the drawings, wherein like reference characters designate like or corresponding parts throughout the several views, there is shown in Fig. 1 (which illustrates a preferred synchronizer embodiment) an oscillator 11 whose frequency of oscillation is such that a given microsecond change of bearing pulse is obtained per degree of antenna rotation; e. g., if one microsecond change per degree antenna rotation is desired then the period of oscillation should be 360 microseconds and the frequency 2,777.77 C. P. S. The output frequency is fed to count-down circuit 12 which produces a wave at the desired transmitter pulse repetition frequency. Delay line 14 transforms each pulse from circuit 12 into three pulses which serve as a reference group. The delay between the first and third pulses of this reference group identifies the transmitting station and is the same as the DME reply pulse spacing on the same frequency channel; e. g., 56 microseconds for channel 96D. The output of oscillator 11 is also applied to phase shift resolver 16 which is synchronized with the movement of the radar antenna by linkage 17 to produce a phase shift in the input wave which is linear with antenna rotation; this rotation being produced by motor 15. These phase shifted waves are passed to pulse generator 18 which generates a basic bearing pulse each time the input wave reaches a certain portion of its cycle; e. g., each time the input wave passes through zero in the negative direction. Delay line 21 transforms each of the basic bearing pulses into two pulses spaced by a time separation that is identical to the spacing between the second and third pulses of the reference group. The output pulses from count-down circuit 12 trigger generator 23 which produces an enabling gate that is equal to two periods of the output from oscillator 11. The output of delay line 21 is coupled to one of the inputs of coincidence circuit 22 and the enabling gate from generator 23 is coupled to the other input thereby enabling only those bearing pulses that are coincident with the enabling gate to appear at the output of circuit 22; thus, two, and only two, groups of bearing pulses are present in the output pulse train at all times. The enabled bearing pulse groups from circuit 22 and the reference pulses from delay line 14 are connected through trigger circuits 24 and 26, respectively, where they are shaped, and then are combined to produce the triggering input for the modulator.

Fig. 2 shows the complete pulse transmission as it would appear on a properly synchronized oscilloscope with typical spacings. The reference pulse group consists of three pulses 31, 32, and 33 in which the spacing between pulse 31 and pulse 33 identifies the transmitting station and is the same as the DME reply pulse spacing on the same radio frequency channel; e. g., 56 microseconds for channel 96D. The spacing between pulses 32, 33 of the reference pulse group and between pulses 34, 36 and 37, 38 of the bearing groups (here shown to be 8 microseconds) is less than the shortest DME pulse spacing and must be decoded in the bearing indicator unit. Unless the proper combination of five pulses is received, the bearing indicator will not respond. For an antenna rotation of 60 R. P. M. and an 8 degree beam width the number of pulse-trains per antenna beam width for the illustrated typical spacings is approximately 12.

The linear increase between reference pulse to bearing pulse spacing as the antenna rotates is shown in Fig. 3. At zero degrees the spacing between the last reference pulse 33 and the last bearing pulse 36 is some fixed value, shown here to be 200 microseconds. This spacing increases linearly at some rate, e. g., 1 microsecond per degree, as the antenna rotates, and for the shown values the spacing is 560 microseconds at 360 degrees. In order to eliminate ambiguity and permit full averaging of the pulse spacing in the vicinity of zero degrees, overlap sectors (two bearing pulse groups following each reference pulse group) are provided as shown by the broken lines. This overlap was extended to the full 360 degrees to provide constant loading of the transmitter with antenna rotation.

The bearing pulse train transmission is received by the airborne (or shipborne, etc.) DME interrogator unit which decodes the spacing of the reference pulse group (characteristic of the DME channel). In the bearing indicator shown in Fig. 4, the raw video from the DME is conducted to delay line 41, which has the same delay as exists between the individual pulses of the bearing pulse groups. Decoded video is conducted from the DME to one input of decoder 42 and the delayed raw video from delay line 41 is applied to the other input. When the proper triple pulse group is received, the third pulse from the decoded video and second pulse from the delay line 41 coincide and a single pulse is produced at the output of decoder 42. The operation of decoder 43 is similar to that of decoder 42 except that delayed and undelayed "raw" video are applied to the inputs of decoder 43 so that all pulse pairs are decoded, i. e., the first delayed pulse of a pulse pair and the second undelayed pulse of the same pulse pair coincide and a single pulse appears at the output of decoder 43. The output of decoder 42 is coupled to gate generator 44 which produces a gate having a period that is controlled by gate control circuit 46. A gate circuit 47 initiates an early gate pulse upon the termination of the gate from generator 44 and differentiator 48 forms a late gate pulse by differentiating the early gate. The output of decoder 43 is connected to the inputs of coincidence circuits 51 and 52 so that when there is coincidence between a bearing pulse and the early gate pulse applied from gate circuit 47 a pulse is formed at the output of circuit 51 and likewise when there is coincidence between a bearing pulse and the late gate from differentiator 48 a pulse is formed at the output of circuit 52. Motor driver 53 converts the output pulse from circuit 51 into the proper form to energize the field windings of motor 54 to cause the armature of the motor to rotate in one direction to operate bearing indicator 56 to change the azimuth indication and to operate gate control circuit 46 to shorten the gate generated by generator 44. The action of motor driver 57 and the field windings of motor 54 is similar in the reverse sense, i. e., the gate from generator 44 is lengthened and the azimuth indication of indicator 56 is changed towards the opposite direction. As the indication from bearing indicator 56 approaches the correct bearing, some of the pulses fall within the early gate, and some within the late gate. The speed and direction of motor rotation is determined by the difference in the number of output pulses from drivers 53 and 57 and, as a result, at very nearly the correct bearing, motor 54 rotates more slowly and finally stops at a point that corresponds to the reception of an equal number of pulses from both coincidence circuits 51 and 52. The AGC (automatic gain control) circuit 58 integrates the number of pulses received per antenna scan to produce a voltage which is applied to the grids of the DME to control the gain of the receiver so that only the main beam of the antenna actuates the bearing indicator. In order to produce a continuous search condition in the absence of bearing information, control 59 allows current to flow through one field winding of motor 54 in the absence of output from coincidence circuits 51 and 52. When bearing pulses are received and there is an output from either driver 53 or 57, control 59 cuts off, but goes into operation again following a loss of signal.

In Fig. 5 two aircraft 101 and 102 are shown at different bearings from the ground station 103. Aircraft 101 receives a different reference pulse to bearing pulse spacing (shown as "a") from that of aircraft 102 (shown as "b"). Each aircraft carries a bearing indicator attachment having a servo-mechanism which measures the reference pulse to bearing pulse spacing in a manner illustrated in Fig. 6.

In Fig. 6 the shaded area 111 represents the duration of a linear delay gate from gate generator 44 which is initiated by the decoded reference pulses (outer edge of the shaded area 111) and whose duration is determined by the setting of gate control 46. Following and initiated by the linear gate are the "early" and "late" gates. The indicator 56 is adjusted so that when its pointer is at zero degrees, the time interval between the start of the linear gate and the center of the "early" and "late" gates is the same as that between pulses 33 and 36, which for the value shown in Fig. 3 at zero degrees is 200 microseconds, and at 360 degrees is 560 microseconds. In other words, the indicator pulse space measuring range is adjusted to be exactly the same as the range of pulse spacing of the ground equipment.

Referring again to Fig. 5, the reference pulse to bearing pulse spacing (dimension "a") is shown to vary slightly over the antenna beam width such that spacings which are greater and less than the spacing at the center of the beam are received by aircraft 101. The broken lines 112 and 113 in Fig. 6 represent the antenna beam width, and the indicator is aligned with the bearing pulses. Under this condition the same number of pulses fall within the early and late gates. If the bearing of the aircraft changed, such that more pulses fell within the early gate than in the late gate, the action of the servomechanism would turn the indicator pointer counterclockwise to operate gate control 46 of Fig. 4 to reduce the gate length from gate generator 44. If the bearing of the aircraft changed such that more pulses fell in the late gate than in the early gate, the servo action would be such as to increase the gate length. Thus the total number of decoded bearing pulses are maintained equally divided between the early and late gates, and the pointer indicates the bearings of the aircraft (in this example) to the ground facility. Full averaging of the received pulse spacings is provided near zero degrees by virtue of the duplicate bearing pulse groups emitted by the ground equipment. The length of the tracking gates is such that one or the other of the bearing pulse groups (but not both) actuate the indicator.

A circuit capable of performing the functions of the block components of Fig. 1 is shown in Figs. 7a and 7b. Oscillator 11 is illustrated as a Wien bridge oscillator which is a well known oscillator one form of which is shown in Figs. 12–19 page 261, of Electron-Tube Circuits by Samuel Seely, McGraw-Hill Book Co. Inc., New York, 1950. The output of oscillator 11 is coupled through coupling capacitor 121, across grid leak resistor 122, to the grid of tube 123. The circuit containing tube 123 is biassed by resistor 126 and capacitor 127 and the amplified and squared output which appears across plate resistor 124 is conducted via coupling capacitor 128 and across grid biassing resistors 129 and 131, to one of the grids of tube 132. The other grid of tube 132 is coupled across bias resistor 141 through a parallel arrangement of capacitor 133 and resistor 134 to the plate of tube 136 which in turn has its grid joined across grid resistors 137 and 138 through capacitor 139 to the plates of tube 132. Tubes 132 and 136 and associated circuit components comprise a count-down multivibrator which transforms the input frequency to an integral quotient of its value. For example, with an input frequency of 2,777.77 C. P. S., the output frequency generated in plate resistor 142 may be 555.55 C. P. S., or ⅕ of the input, if the values of the circuit components are so chosen. The output of this count-down circuit is fed through coupling capacitor 143, across grid resistor 146, to the grids of tube 147, which has two plate resistors 148 and 149, one for each plate. Tube 147 amplifies the input pulses and transmits them by coupling capacitor 151 and across grid bias resistor 152 to one of the grids of tube 153. The secondary of transformer 154 which joins the other grid to a grid bias supply, and the primary of transformer 154 which is in the plate circuit, provide the feedback coupling that is required for the blocking oscillator action of tube 153. The shaped and amplified pulses from tube 153 are coupled by another secondary winding of transformer 154 to the control grid of the delay line driver tube 156. The plate circuit of tube 156 comprises resistor 157, capacitor 158, and input winding 159 of a magnetostriction delay line. There are three output windings 161, 162, and 163 from this delay line connected through three rectifiers 164, 166, and 167, respectively, which form the three pulses of the reference group. For the time interval shown in Fig. 2, there would be 56 microseconds delay between windings 161 and 163, and an 8 microseconds delay between the outputs of windings 162 and 163. These pulses are applied through cathode follower 170, amplifier 171, and inverter 172, the circuit details of which are not shown since suitable circuits for such components are well known in the art, and through coupling capacitor 173 to one grid of output blocking oscillator tube 174.

The output from the Wein bridge oscillator 11 is also conducted through capacitor 181 to potentiometer 182 whose variable arm is connected to the grid of cathode follower tube 183. Cathode resistor 184 is connected through capacitor 186 to the rotor winding 187 of resolver 188 which is joined through linkage 17 to the rotating antenna. The two stator windings 189 and 193 of the resolver are physically 90 degrees apart and are connected so that their outputs add in quadrature. Capacitor 191 in series with the inductance of winding 189 produces a fixed phase shift of 90 electrical degrees. Resistor 192 is adjusted to make the output of winding 193 equal to that of winding 189 and capacitor 191. Thus, rotation of the resolver by the antenna produces a phase shift which is linear with antenna rotation. The output of the phase shifter feeds a low pass filter arrangement of inductors 194 and 195 and capacitor 196 which removes the higher order harmonics generated in the phase shift resolver. The phase shifted sine wave from the resolver is fed to the grid of cathode follower tube 197 which has a voltage dropping resistor 198 and a decoupling capacitor 199 in its plate circuit. Pulsing transformer 202 couples the output from the cathode follower through a primary winding of transformer 206 to the cathode of rectifier tube 207. The output of tube 207 appears across resistor 209 which is joined to the grid of tube 208. Tube 208 has a cathode circuit consisting of the secondary winding of transformer 206 and the parallel arrangement of resistor 212 and capacitor 213, and a plate circuit comprising the parallel connection of radio frequency choke 214 and resistor 216. Tubes 207 and 208 and associated circuit components are a multiar circuit which produces a regenerative action that forms the basic bearing pulses each time the input sinusoidal voltage passes through zero in the negative direction. These pulses are shaped and amplified by the bearing blocking oscillator 219 and fed to the grid of the bearing delay line driver tube 221 whose plate circuit is connected through the input winding 223 of a magnetostriction delay line across a decoupling capacitor 222. The outputs from magnetostriction delay line windings 224 and 226 are joined, respectively, through rectifiers 227 and 228 and through cathode follower 229 and amplifier 231 across grid bias resistor 232 to one of the grids of bearing enabler tube 233.

The second output from amplifier tube 147 is coupled through capacitor 236 across grid resistors 237 and 238 to the grid of a first section of tube 239. The grid of the second section of tube 239 is joined via capacitor 240 to the plate of the first section and is also coupled through resistor 241 to a grid bias supply. The first and second sections, which have plate resistors 242 and 243, respectively, and accompanying circuit components form a shaping amplifier which forms a delayed negative enabling gate of 720 microseconds when pulsed from amplifier 147. This enabling gate is applied through coupling capacitor 246 and across grid resistor 247 to the other grid of tube 233. Only the bearing pulses from amplifier 231 which are coincident with the enabling gate appear across plate resistor 251, but the enabling gate is of such a length that two groups of bearing pulses are present in the output pulse train at all times. The enabled bearing pulse groups are conducted through coupling capacitor 252 across grid bias resistor 253 to the grid of the first section of trigger tube 254. When the grid of the second section is triggered by the output of blocking oscillator tube 153, the second section generates a synchroscope trigger across plate resistor 256 which is conducted through coupling capacitor 257 to the synchroscope. The output of the first section of trigger tube 254 is directly connected to the plates of both sections of output blocking oscillator tube 174, which plates are also connected through the primary winding of transformer 258 to the B+ supply. Bias for the grid of the first section is provided through the parallel arrangement of resistor 260 and rectifier 259 and for the second section through a secondary winding of transformer 258. In this blocking oscillator the reference pulses from inverter 172 and the bearing pulse groups from tube 254 are shaped and combined and coupled via another secondary of transformer 258 to the grid of cathode follower tube 263. The output pulse train consisting of reference and bearing pulses is fed from cathode resistor 264 through coupling capacitor 266 to the modulator.

Most of the circuit details of components suitable for the block diagram components of Fig. 4 are shown in Figs. 8a and 8b. Raw video from the DME is applied to terminal 271, fed through coupling capacitor 272 to the suppressor of tube 273 and through a one-half microsecond delay line 274 and across grid leak resistor 276 to the control grid of tube 273. The output of tube 273, which is the raw video stripped of its noise, is coupled by transformer 277 across grid leak resistor 278 to the grid of cathode follower tube 279. The output from cathode resistor 281 is applied through coupling capacitor 282 across grid leak resistor 283 to the control grid of tube 284 and is also applied through delay line 286, which has a delay of 8 microseconds for the values shown in Figs. 2 and 3, through coupling capacitor 287 across grid leak resistor 288 to the suppressor grid of tube 284. The last undelayed pulse and the first delayed pulse of all pulse pairs having the spacing of delay line 286, will produce simultaneous voltages on the control grid and suppressor grid, respectively, thereby generating a single negative pulse in plate resistor 291.

The signal from delay line 286 is also applied through coupling capacitor 292 across grid leak resistor 293 to the control grid of the reference decoder tube 294. Decoded video from the DME is conducted to input terminal 296 and is fed through coupling capacitor 297 across resistor 289 to the suppressor of tube 294. When the proper triple pulse group is received, the DME decoded video and delayed "raw" video coincide, and a single negative pulse is produced across plate resistor 295. The decoded reference pulse is applied across capacitor 299 through coupling capacitor 298 through diode 301 to the plate of the phantastron tube 302 which generates a negative gate at its cathode. The length of this gate is controlled by the voltage from the linear 360 degree potentiometer 303, whose movable arm is connected by link 306 to the armature of motor 307, which through resistor 304 feeds a positive voltage to the negative terminal of diode 301. The phantastron circuit includes series resistors 308 and 309 whose midpoint terminal is connected directly to the suppressor and also through capacitor 311 to the screen grid of tube 302. Series resistors 312 and 313 have their midpoint terminal connected directly to the screen grid. The control grid is joined via capacitor 319 to the plate and one end of plate resistor 316, and through series resistors 317 and 318 to the B+ supply. The output of phantastron tube 302 appears across cathode resistor 321 and is conducted by rectifier 322 across resistor 323 through capacitor 324 to the grid of gate circuit tube 326. The resistor arrangement comprising resistors 327, 328, and 329 provide a bias voltage for the grid of tube 326 and in conjunction with capacitor 324 differentiate the trailing edge of the phantastron output gate. The plate of tube 326 is joined through capacitor 331 to the grid of tube 332, which has a grid bias resistor 330, and the plate of tube 332 is connected through the parallel arrangement of resistor 333 and capacitor 334 to the grid of tube 326. Tubes 326 and 332 and associated components form a one-shot multivibrator that is triggered by the differentiated trailing edge of the phantastron output gate and produces a negative wave of the order of 100 microseconds in duration which appears between series plate resistors 337 and 336 and is used as the early gate. The plate resistor 338 of tube 332 is joined through differentiating capacitor 341 across differentiating resistor 342 to the grid of coincidence tube 347. The late gate is formed by the differentiating action of capacitor 341 and resistor 342 upon the positive 100 microsecond gate from the plate of tube 332. The previously mentioned early gate is applied through coupling capacitor 346 across grid bias resistor 345 to the grid of coincidence tube 348. Tubes 347 and 353 form a late coincidence circuit and tubes 348 and 351 form an early coincidence circuit, both of which are Rossi-type circuits which generate an output pulse at the plates only when both grids are cut-off simultaneously. The grids of tubes 353 and 351, which have a common grid bias resistor 355, are connected by capacitor 350 to the output of bearing decoder tube 284 and as previously stated, the other corresponding tubes of the coincidence circuits are connected to the late and early gates, respectively. Coincidence of a bearing pulse with the early or late gates causes a positive pulse across plate resistor 349 or plate resistor 352, respectively. Resistor 352 is joined by coupling capacitor 356 across biassing resistor 357, which is connected between resistors 358 and 359, to one grid of thyratron 361, and plate resistor 349 is connected by coupling capacitor 362 across biassing resistor 364 to one grid of thyratron 366. Thyratrons 366 and 361 act as motor driving elements which drive a split-field D. C. motor 307 which has an armature geared to the pointer bearing indicator 56 and to the arm of potentiometer 303. Motor field winding 371 and resistor 372 are connected in the cathode circuit of thyratron 366 and motor field winding 373 and resistor 379 are in the cathode circuit of thyratron 361. The armature winding is energized by a voltage source through a ballast light and resistor 370. A positive output pulse from the early coincidence circuit causes tube 366 to conduct thereby energizing motor field winding 371 to rotate the armature of motor 307 to move the arm of potentiometer to make the phantastron gate shorter. The action of tube 353 and thyratron 361 is similar except to cause the motor armature to rotate in the opposite direction.

As the indicator 56 approaches the correct bearing, some of the pulses fall within the early gate and some within the late gate. Capacitor 376 in the cathode circuit of thyratron 361 and capacitor 377 in the cathode circuit of thyratron 366 each charge slowly through resistor 378 and store energy in proportion to the number of times that their respective thyratron fires. After the antenna beam passes, this energy is dissipated in the respective field windings of the motor 307. At very nearly the correct bearing, the motor rotates more slowly and finally stops when the energy stored in the two capacitors becomes equal. The magnetic field created by discharge of the capacitors 376 and 377 into field windings 373 and 371, respectively, contributes to the integration by causing the motor 307 to continue rotating in the same direction between bursts of information from the transmitting antenna. Due to the abrupt discontinuity at the ends of the 360 degree potentiometer winding of potentiometer 303, the phantastron control voltage and output gate width changes from maximum to minimum, but smooth operation over this discontinuity is achieved by the continuous transmission from the ground equipment of two sets of bearing pulses spaced 360 microseconds (which corresponds to 360 degrees for the values of Figs. 2 and 3).

The positive gate from multivibrator tube 332 is also applied through capacitor 381 across grid resistor 382 to the grid of tube 383. Resistor 386 conducts the voltage appearing at the junction of cathode resistor 384 and capacitor 385 to the grid of tube 388 which has a grid leak bias consisting of resistor 391 and capacitor 392. Capacitor 385 along with associated resistors, integrates the number of reference pulses received per antenna scan and controls the average D. C. voltage across plate resistor 393 of tube 388, which voltage is applied through a divider network consisting of resistors 396, 397, and potentiometer 398 to the DME receiver. In this manner, the gain of the receiver is reduced to allow only the main beam of the antenna to actuate the bearing indicator.

In the absence of bearing information, it is necessary and also considered to be a fail-safe feature that the bearing indicator 56 go into a continuous search condition. Tube 401, whose cathode is joined to the cathode of thyratron 361, controls the search function by allowing tube current to flow through motor field winding 373 in the absence of output from the thyratron tubes. When bearing pulses are received and either of the thyratrons fire, tube 401 is cut off through resistor 400 by the integration action of tube 402 which has its grid joined to resistor 378. This integration action of tube 402 is produced by plate resistor 403, bias resistor 404, and capacitor 406 which is connected between the grid and the plate. Following the loss of signal, the indicator 56 will go into search at a time controlled by the time constant of tube 402. The angular rate of search is determined by the plate resistance 407 of tube 401 and the motor field windings 373.

Although it is apparent that there are many suitable values for the circuit components of Figs. 7 and 8, the following listing of values is presented for illustrative purposes:

Tubes:

| | Type |
|---|---|
| 123, 136, 183, 197, 207, 208, 279, 347, 348, 351, 353, 383 | ½ 12AU7 |
| 132, 147, 153, 174, 233, 239, 254, 263 | 6J6 |
| 326, 332 | ½ 6J6 |
| 156, 221 | 6AQ5 |
| 273, 284, 294, 302 | 6AS6 |
| 361, 366 | 2D21 |
| 401, 402 | ½ 12AT7 |

Resistors:

| | Ohms |
|---|---|
| 152, 182, 192, 264, 283, 288, 289, 323, 329, 358 | 100K |
| 184, 237 | 680 |
| 198 | 11K |
| 212 | 2.2K |
| 122, 137, 209, 316, 342, 345, 382, 396, 400 | 1 meg |
| 216, 321, 403 | 5.6K |

| Resistors | Ohms |
|---|---|
| 126 | 7.5K |
| 124 | 75K |
| 129, 330 | 1.2 meg. |
| 131, 138, 238, 318 | 500K |
| 141, 355 | 330K |
| 134, 138, 232, 241, 247, 260, 357, 364 | 560K |
| 142, 313, 338 | 33K |
| 146 | 470K |
| 148, 243, 251, 291, 295, 349, 352 | 22K |
| 149, 242, 251, 393 | 62K |
| 157 | 1,000 |
| 253 | 270K |
| 276 | 15K |
| 278, 308 | 220K |
| 281 | 4.7K |
| 293 | 110K |
| 309, 372, 379, 407 | 12K |
| 312 | 18K |
| 327, 328, 359 | 150K |
| 317 | 430K |
| 337 | 6.2K |
| 333 | 390K |
| 384 | 120K |
| 386 | 16.4 meg. |
| 391 | 10 meg. |
| 397 | 470 |
| 304 | 10K |
| 303 | 190K |
| 398 | 250K |
| 370 | 50 |
| 378 | 100 |
| 404 | 5.6 meg. |
| 336 | 27K |

| Capacitors: | Micromicrofarads (unless otherwise designated) |
|---|---|
| 181, 199 | .05 microfarads |
| 186 | .1 do |
| 191 | 1200 |
| 196 | 240 |
| 213, 236, 266, 376, 377, 406 | 1 microfarads |
| 121 | 3000 |
| 128, 139 | 2000 |
| 133 | 330 |
| 143 | 2600 |
| 151, 173, 324, 350, 381 | 220 |
| 158 | 0.5 microfarads |
| 222, 240, 246, 252, 272 | .01 do |
| 257 | 1000 |
| 282, 287, 292 | 560 |
| 297, 341 | .002 microfarads |
| 298, 331 | 100 |
| 299 | 47 |
| 311 | 430 |
| 319 | 4700 |
| 334 | 270 |
| 385 | 3 microfarads |
| 392 | .35 do |
| 356, 362 | .001 do |
| 346 | 1720 |

| Voltages: | Volts |
|---|---|
| $V_1$ | +300 |
| $V_2$ | +150 |
| $V_3$ | +28 |
| $V_4$ | −150 |

It has been shown that the present invention provides an azimuth indication utilizing the pulse code which is already established for channeling another function in existing equipment. Also the indicator circuit averages the pulse spacing change over the beam width of the transmitting antenna to give true bearing indications regardless of signal strength or antenna beam width. True averaging and elimination of ambiguity is obtained by the generation of two sets of bearing pulses in the sector of discontinuity of the indicator. Some other features are the averaging of information by double integration in the motor drive circuits and the provision of a search function without a mechanical relay.

Obviously many modifications and variations of the present invention are possible in the light of the above teachings. It is therefore to be understood that within the scope of the appended claims the invention may be practiced otherwise than as specifically described.

What is claimed is:

1. In a transmitting system having a rotating antenna, a pulsing circuit for providing an input train of pulse groups to the modulator in said transmitting system, said circuit comprising: a sine wave source; means for utilizing the output of said sine wave source to produce reference pulse groups whose group frequency is a submultiple of the frequency of the sine wave source output; phase shifting means connected to said sine wave source and said rotating antenna for producing bearing pulse groups, the time of occurrence of each bearing pulse group being a function of the aximuthal position of said antenna; and means for combining said reference pulse groups with said bearing pulse groups for feeding into said modulator.

2. In a transmitting system having a rotating antenna, a pulsing circuit for providing an input train of pulses to the modulator in said transmitting system, said circuit comprising: a source for producing an alternating current wave; means fed by said alternating current wave for producing a basic reference pulse after a predetermined integral number of cycles of said alternating current wave; pulse producing means operated by each reference pulse to produce three reference pulses, the spacing between the first and third pulses being such as to identify the transmitting station and being the same as the distance measuring equipment reply pulse spacing on the same frequency channel, and the spacing between the second and third pulse being less than the shortest distance measuring equipment pulse spacing; means responsive to antenna rotation for producing a phase shifted output of said alternating current wave, the amount of phase shift being a function of antenna position; means energized by said phase shifted output for producing a basic bearing pulse each time said phase shifted output is at a certain part of its cycle; means energized by each said basic bearing pulse for producing two bearing pulses, the spacing between said two bearing pulses being the same as the spacing between the second and third reference pulses; gating means fed by said bearing pulses and triggered by each said basic reference pulse for providing an output comprising two and only two pairs of bearing pulses after each basic reference pulse; and means for combining the output of said pulse producing means with the output of said gating means for feeding into said modulator.

3. The pulsing circuit of claim 2, wherein said means responsive to antenna rotation comprises: a phase shift resolver which is connected to rotate in synchronism with said antenna.

4. The pulsing circuit of claim 3 wherein said means for producing a basic bearing pulse is a multiar pulse generator.

5. The pulsing circuit of claim 4 wherein said means to produce three reference pulses comprises a delay line having one input and three outputs and wherein said means for producing two bearing pulses comprises a delay line having one input and two outputs.

6. In a transmitting system having a rotating antenna, a pulsing circuit for providing an input train of pulses to the modulator in said transmitting system, said circuit comprising: an oscillator for producing an alternating current wave; a count-down circuit connected to be energized by said alternating current wave for producing an output train of basic reference pulses as a submultiple of the frequency of said alternating current wave; a reference pulse delay line coupled to be energized by said basic reference pulses to produce three reference pulses for each basic reference pulse input, the time delay between the first and third pulse being such as to identify the transmitting station which is the same as the distance measuring equipment reply pulse spacing on the same frequency channel, and the spacing between the second and third pulse being less than the shortest distance measuring equipment pulse spacing; a gate generator connected to be triggered by each basic reference pulse for producing an enabling gate whose period is equal to two cycles of said alternating current wave; a phase shift resolver fed by said alternating current wave and connected to rotate in synchronism with said antenna thereby producing a phase shifted alternating current output whose phase shift is a function of antenna position; pulse generator means energized by said phase shifted output for producing a basic bearing pulse each time said phase shifted output is at a certain part of its cycle; a bearing pulse delay line coupled to the output of said pulse generator means for producing two bearing pulses upon being energized by a basic bearing pulse, the spacing between said two bearing pulses being the same as the spacing between said second and third reference pulses; a coincidence circuit having two inputs one of which is connected to the output of said gate generator and the other of which is connected to the output of said bearing pulse delay line for producing an output of bearing pulses that coincide with the enabling gate; a reference pulse shaping circuit for shaping the reference pulses from said reference delay line so that said reference pulses will have a shape suitable for the input to a modulator; a bearing pulse shaping circuit for shaping the bearing pulses from said coincidence circuit so that said bearing pulses will have a shape suitable for the input to a modulator; and means for combining the outputs of said reference and bearing pulse shaping circuits for feeding into said modulator.

7. In a receiver having distance measuring equipment, an azimuth indicating circuit comprising: a first terminal for connection to said distance measuring equipment to have raw video impressed thereon; a second terminal for connection to said distance measuring equipment to have decoded video impressed thereon; a delay line connected to said first terminal; a first decoder circuit having two inputs one of which is joined to said second terminal and the other of which is coupled to the output of said delay line for producing an output pulse upon coincidence of pulses in the two inputs; a second decoder circuit having two inputs one of which is connected to said first terminal and the other of which is joined to the output of said delay line for producing an output pulse upon coincidence of pulses in the two inputs; a gate generator for producing a gate upon being pulsed by the output of said first decoder circuit; a gate control circuit for controlling the length of gate produced by said gate generator; a first gate circuit for producing a gate that commences with the termination of the gate from said gate generator and which exists for a predetermined time; a second gate circuit comprising a differentiator for differentiating the gate from said first gate circuit and thereby producing a second gate; a first coincidence circuit for producing a pulse upon coincidence of a pulse from said second decoder circuit and a gate from said first gate circuit; a second coincidence circuit for producing a pulse upon coincidence of a pulse from said second decoder circuit and a gate from said second gate circuit; a bearing indicator; a motor having an output connection for driving said bearing indicator and also said gate control circuit thereby controlling the length of gate from said gate generator; a first motor driver having an input connected to said first coincidence circuit and an output joined to the windings of said motor for producing a current in the motor windings which will cause the motor output to rotate through an angle in one direction that is proportional to the number of pulses per unit time in the output of said first coincidence circuit; and a second motor driver having an input joined to said second coincidence circuit and an output joined to the windings of said motor for producing a current in the motor windings which will cause the motor output to rotate through an angle in a direction opposite from said one direction and which is proportional to the number of pulses per unit time in the output of said second coincidence circuit.

8. The azimuth indicating circuit of claim 7 and an automatic gain control circuit connected to integrate the output of said first gate circuit for producing a control voltage for application to the distance measuring equipment so that only the main beam of a received signal will actuate the azimuth indicating circuitry.

9. The azimuth indicating circuit of claim 8 and a search function generator having two inputs, one of which is joined to the output of said first motor driver and the other of which is joined to the output of said second motor driver, and having an output connected to one of said motor drivers for producing a continuous rotation of said bearing indicator indication in the absence of a received signal.

10. In a receiver having distance measuring equipment, an azimuth indicating circuit comprising: a first terminal for connection to said distance measuring equipment to have raw video impressed thereon; a second terminal for connection to said distance measuring equipment to have decoded video impressed thereon; pulse producing means connected to said first terminal for producing an output pulse whenever a pair of pulses on said first terminal have a certain time separation; a gate generator connected to said first terminal and said second terminal for producing an early gate of a certain length and upon the termination of the early gate a late gate of a certain length, upon the simultaneous occurrence of a pair of pulses at said first terminal and a pair of pulses at said second terminal wherein the separation of the pulses of each pair have the afore-mentioned certain separation; an early gate coincidence circuit fed by the outputs of said pulse producing means and said gate generator for producing an output pulse for each pulse from said pulse producing means that is coincident with an early gate from said gate generator; a late gate coincidence circuit fed by the outputs of said pulse producing means and said gate generator for producing an output pulse for each pulse from said pulse producing means that is coincident with a late gate from said gate generator; a bearing indicator; a motor having an output connection for driving said bearing indicator and also for controlling the time of early and late gate occurrences from said gate generator; first motor driver means responsive to the output of said early gate coincidence circuit for energizing said motor to rotate through an angle in one direction proportional to the number of pulses per unit time in the output of said early gate coincidence circuit; and second motor driver means responsive to the output of said late gate coincidence circuit for energizing said motor to rotate through an angle in a direction opposite from said one direction proportional to the number of pulses per unit time in the output of said late gate coincidence circuit.

11. The azimuth indicating circuit of claim 10 and an automatic gain control circuit connected to integrate the output of said gate generator for producing a control voltage for application to the distance measuring equipment so that only the main beam of a received signal will actuate the azimuth indicating circuitry.

12. The azimuth indicating circuit of claim 10 and a search function generator having two inputs one of which is joined to the output of said first motor driver means and the other of which is joined to the output of said second motor driver means and having an output joined to one of said motor driver means for producing a continuous rotation of said bearing indicator indication in the absence of a received signal.

13. A system for providing a bearing indication of a point at which a receiver is located, the bearing indication being with respect to another point at which a transmitter having a rotating antenna is located, said system comprising: a pulsing circuit for a transmitter comprising: means for producing reference pulses in groups of three wherein the separation between the first and third pulse is such as to identify the transmitting station and is the same as the DME reply pulse spacing on the same frequency channel, and the spacing between the second and third pulses is less than the shortest DME pulse spacing; means for producing bearing pulses in groups comprising two pairs of bearing pulses each wherein the separation of the pulses of each pair is the same as the separation between the second and third pulses of each reference group, the groups of bearing pulses being arranged such that the time separation between a reference group and the next subsequent bearing pulse group is a function of antenna position and in which the time separation between the two pairs of bearing pulses of any bearing pulse group is equal to the maximum time change between a reference pulse group and the next subsequent bearing pulse group; and means for combining said reference pulse groups with said bearing pulse groups for feeding into the modulator of the transmitter; and an azimuth indicating circuit for a receiver comprising: gate generating means responsive to received reference pulses and bearing pulses for generating an early gate at a controllable time after the reception of the reference pulses and for producing a late gate immediately upon the termination of the early gate; pulse generating means for producing a single pulse upon the reception of each bearing pulse pair; an early gate coincidence circuit having one input joined to the output of said pulse generating means and another input connected to receive early gates from said gate generating means for producing an output pulse for each pulse from said pulse generating means that is coincident with an early gate; a late gate coincidence circuit having one input joined to the output of said pulse generating means and another input connected to receive an early gate from said gate generating means for producing an output pulse for each pulse from said pulse generating means that is coincident with a late gate; a bearing indicator; a motor having an output connection for driving said bearing indicator and also for controlling the time of early and late gate occurrences from said gate generating means; first motor driver means responsive to the output of said early gate coincidence circuit for energizing said motor to rotate through an angle in one direction proportional to the number of pulses per unit time in the output of said early gate coincidence circuit; and second motor driver means responsive to the output of said late gate coincidence circuit for energizing said motor to rotate through an angle in a direction opposite from said one direction proportional to the number of pulses per unit time in the output of said late gate coincidence circuit.

References Cited in the file of this patent

UNITED STATES PATENTS

| | | |
|---|---|---|
| 2,449,982 | De Rosa | Sept. 28, 1948 |
| 2,539,905 | Herbst | Jan. 30, 1951 |
| 2,585,002 | Frum | Feb. 12, 1952 |

FOREIGN PATENTS

| | | |
|---|---|---|
| 617,681 | Great Britain | Feb. 10, 1949 |